United States Patent

Stueble

[19]

[11] Patent Number: 5,814,114
[45] Date of Patent: Sep. 29, 1998

[54] AIRBORNE WASTE FILTER ARRANGEMENT

[75] Inventor: Helmut Stueble, Spartanburg, S.C.

[73] Assignee: LTG Air Engineering, Inc., Spartanburg, S.C.

[21] Appl. No.: 823,807

[22] Filed: Mar. 24, 1997

[51] Int. Cl.⁶ .................................................. B01D 29/62
[52] U.S. Cl. ........................... 55/284; 15/312.1; 15/352; 55/294; 95/279
[58] Field of Search ............................. 55/283, 284, 294, 55/484, 498; 15/312.1, 312.2, 352; 210/413; 95/279

[56] References Cited

U.S. PATENT DOCUMENTS

| | | |
|---|---|---|
| 3,606,735 | 9/1971 | Baigas, Jr. . |
| 4,154,588 | 5/1979 | Herndon, Jr. . |
| 4,251,237 | 2/1981 | Smith . |
| 4,289,510 | 9/1981 | Herndon, Jr. ............................. 55/294 |
| 4,364,755 | 12/1982 | Ferri . |
| 4,563,269 | 1/1986 | Furukawa ................................. 55/294 |
| 5,114,444 | 5/1992 | Stuble . |
| 5,453,117 | 9/1995 | Carter et al. ............................. 55/294 |
| 5,507,851 | 4/1996 | Kennington .............................. 55/294 |

FOREIGN PATENT DOCUMENTS

| | | |
|---|---|---|
| 118299 | 3/1944 | Australia . |
| 604096 | 10/1934 | Germany . |
| 1077718 | 8/1967 | United Kingdom . |

*Primary Examiner*—C. Scott Bushey
*Attorney, Agent, or Firm*—Dority & Manning, P.A.

[57] ABSTRACT

An airborne filter system includes an array of drum filters and a frame disposed in a permanent operative position proximate the array. A plurality of longitudinal members are operatively disposed on the frame, each longitudinal member extending into the interior area of a drum filter. A suction nozzle extends from each longitudinal member to operatively communicate with the interior surface area of the drum filter for removing waste material therefrom. A drive mechanism is in operative communication with the longitudinal members to rotate each about its longitudinal axis and to reciprocally move each longitudinal member substantially along the longitudinal axis of the drum filter from which the longitudinal member extends so that a suction end of the suction nozzle is moved substantially over the inner surface of the filter. A suction source is in operative communication with each suction nozzle to apply suction to the suction nozzles so that the waste material is drawn therethrough.

22 Claims, 7 Drawing Sheets

*Fig. 8C* ial systems,
AIRBORNE WASTE FILTER ARRANGEMENT

BACKGROUND OF THE INVENTION

The present invention relates to a filter arrangement including an array of drum-type filters, wherein air flows from the inside of each filter to the outside. The filter arrangement includes a system for removing waste material from the inside of the drum-type filters.

Airborne waste material produced in industrial systems, for example textiles, wood processing or other systems where significant amounts of waste or dust is generated, may be filtered by a variety of types of filter systems, for example including large drum filters and bag filter arrangements. Conventional drum filters are large cylindrical filters having automatic stripping mechanisms for removing waste from the drum. These filters, however, require a great amount of floor space. Bag filter systems are also relatively bulky and often require manual cleaning.

Multi-drum filters offer a more compact design which can filter a large amount of waste material. These filters include an array of small drum-type filters arranged in a parallel array. Each individual drum filter is much smaller than the conventional drum filter. For example, a single smaller filter drum of a multi-drum filter array may be approximately one-half meter long with a diameter of approximately 40 centimeters, whereas the corresponding dimensions for a conventional drum filter may be several feet. The filter array arranges a relatively large total cleaning surface area in a compact formation, allowing the array to filter a relatively large volume of air while occupying a relatively small floor space.

Each drum filter in the array is a cylinder with a filter medium around its exterior. The filter material may be a mesh-like material, various woven or nonwoven materials, or any suitable medium, as should be understood by those of ordinary skill in the art. Air carrying waste material enters one end of the drum and is drawn through the circumferential filter material, causing waste build up on the filters' interior surfaces.

SUMMARY OF THE INVENTION

The present invention recognizes and addresses disadvantages of prior art constructions and methods. Accordingly, it is an object of the present invention to provide an improved multi-drum filter arrangement.

It is also an object of the present invention to provide a multi-drum filter arrangement having an automatic cleaning system having an improved drive system.

It is a further object of the present invention to provide a multi-drum filter arrangement having a cleaning system which optimizes suction flow therethrough.

Some of these objects are achieved by an airborne waste filter system comprising an array of drum filters. Each drum filter of the array has a forward end into which air carrying waste material flows. A rearward end is longitudinally opposite the forward end. A filter section extends between the forward end and the rearward end so that the forward end, the rearward end and the filter section define an interior area of the drum filter. A frame is disposed in a permanent operative position proximate the array of drum filters. Each of a plurality of longitudinal members is operatively disposed on the frame and extends into an interior area of a drum filter. Each longitudinal member has a suction nozzle extending therefrom to operatively communicate with interior surface of the drum filter's cylindrical filter section for removing waste material therefrom. A drive mechanism is in operative communication with the longitudinal members to rotate each about its longitudinal axis and to reciprocally move each longitudinal member substantially along the longitudinal axis of the drum filter into which it extends so that a suction end of the suction nozzle is moved substantially over the inner surface of the filter section.

The accompanying drawings, which are incorporated and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENT

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
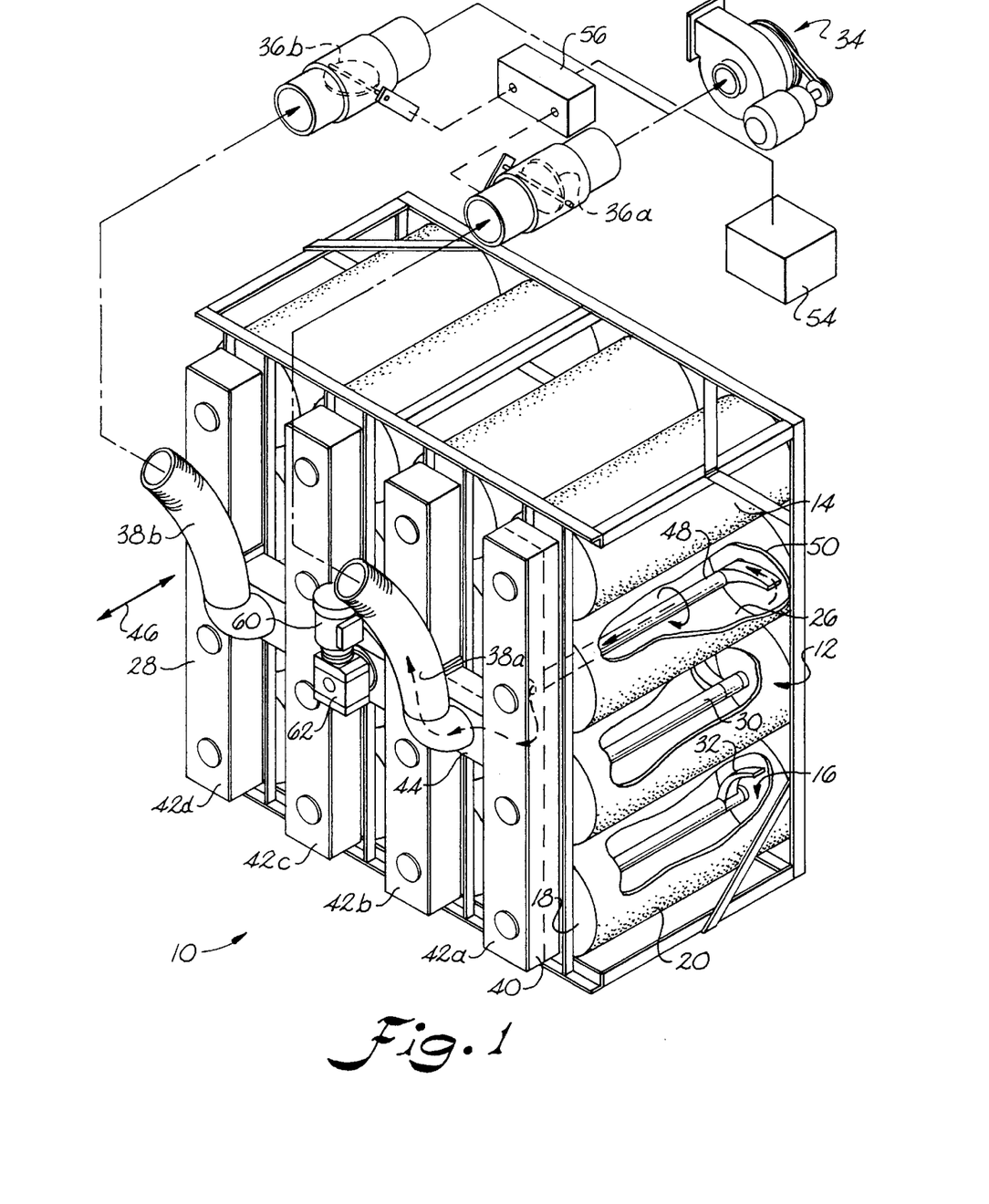
FIG. 1 is a perspective view of an embodiment of the filter system of the present invention.

The present invention is concerned with an improved filter system, for example for use in textile operations. Accordingly, FIG. 1 depicts a presently preferred embodiment of a filter system, shown generally at 10, including an array 12 of drum filters 14. Each drum filter 14 has an open forward end 16 and a closed rearward end 18 longitudinally opposite the open forward end. A generally cylindrical filter material 20, which may be constructed from mesh-like, woven, nonwoven or other suitable materials, extends between rearward end 18, which may comprise a solid plate, to forward end 16. Although the plate at rearward end 18 is illustrated as a flat circular disk, it should be understood that any suitable means for blocking the waste-carrying air flow from the drum filter interior may be used.

The construction and operation of an array of drum filters which may be used in the present invention is disclosed in U.S. Pat. No. 5,114,444, the entire disclosure of which is incorporated by reference herein. Briefly, however, cylindrical filter material 20 may be constructed of a collapsible material having a ring 22 (FIG. 2) attached to its forward end and an elastic cord attached about its rearward end. The filter material may thus be loaded from the rearward area of the array by compressing the clip 22, inserting it through an appropriate hole of wall 24, releasing the clip so that it is secured in the hole, pulling the material back and over the plate covering rearward end 18, and releasing the material so that the elastic cord contracts to hold the material into position about the plate.

Forward end 16 is open to air flow. Air carrying waste material flows from upstream machinery to wall 24. The air flow may be partially filtered upstream from wall 24 by a pre-filter, as should be understood by those of ordinary skill in the art. This air is drawn by suction through the openings in wall 24 into filters 14 and through each filter's cylindrical filter material 20, causing waste material to collect on cylindrical filter material inner surface 26.

To clean interior surfaces 26, a frame 28 rotationally supports a plurality of longitudinal members, such as tubes 30, having suction nozzles 32 extending out to inner surfaces 26. Suction is applied from a suction source 34 to each of the nozzles 32 through dampers 36a and 36b and hoses 38a and 38b, as indicated by the flow arrows in FIGS. 1, 5 and 7. In these illustrated embodiments, waste from an inner surface 26 flows into a nozzle 32, through a tube 30 and into a rear chamber (indicated in phantom at 40) of one of the vertical bars 42a–42d of frame 28. It is then drawn through a similar rear section in a horizontal bar 44 to a hose 38a or 38b to a damper 36a or 36b.

So that nozzles 32 may remove waste material from substantially all of inner surface areas 26, frame 28 moves back and forth with respect to the axes of drum filters 14, as indicated by arrow 46, while tubes 30 are rotated, for example as indicated by arrow 48. Such reciprocal movement of frame 28, in conjunction with the rotation of tubes 30, causes the free ends 50 of nozzles 32 to follow a helical path over their respective inner surface areas 26.

Figure 2:
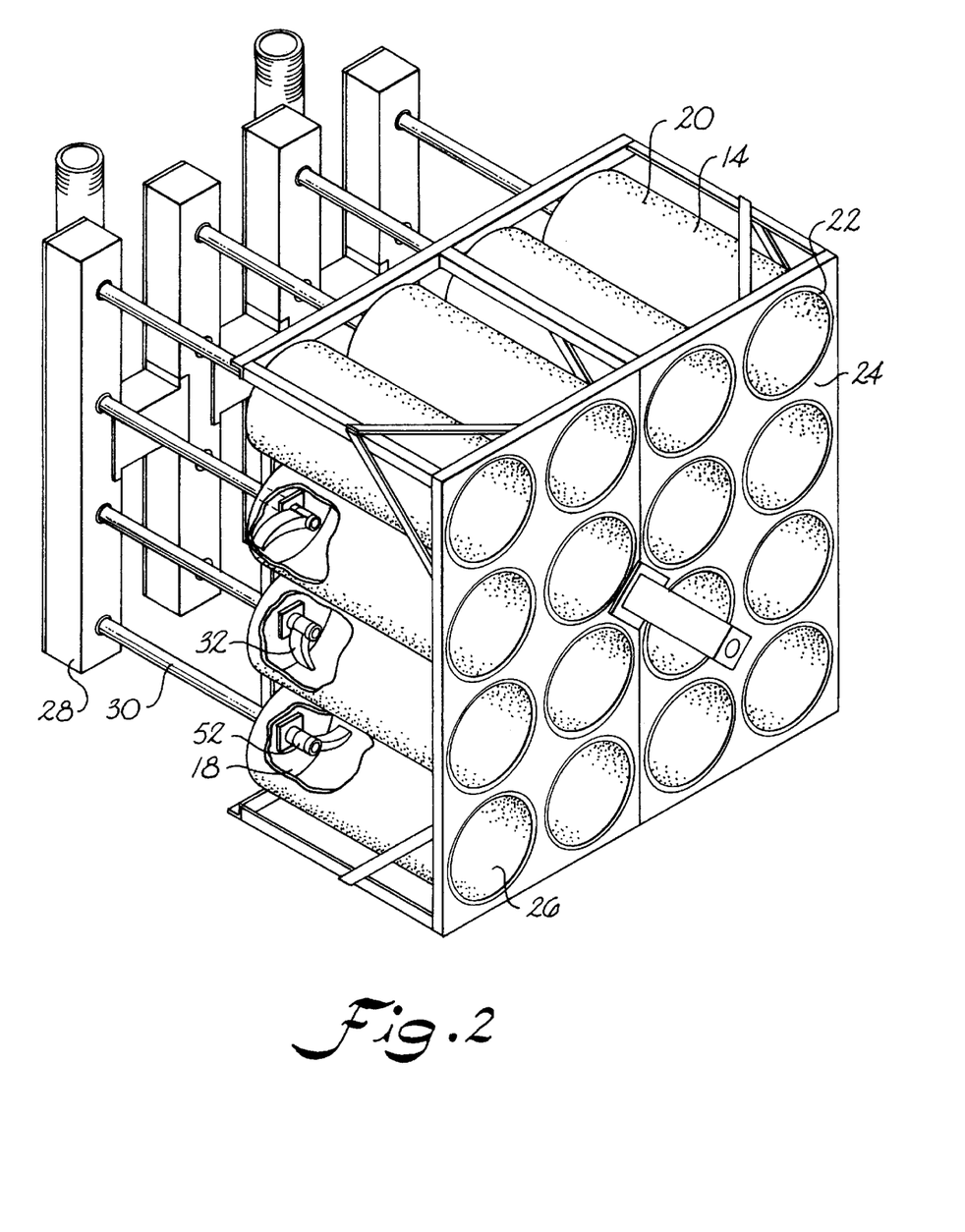
FIG. 2 is a second perspective view of the embodiment of the filter system as shown in FIG. 1.

Frame 28 is illustrated in FIG. 1 in a fully inward position wherein tubes 30 are fully inserted into the interior areas of their respective drum filters 14. The frame is illustrated in its fully extended position in FIG. 2. In FIG. 2, nozzles 32 are drawn back to the rearward plates through which tubes 30 extend by way of seals 52.

Tubes 30 are rotated at a rate fast enough so that free ends 50 of nozzles 32 cover substantially the entire surface areas 26 as they move between their positions as shown in FIGS. 1 and 2. To maximize air flow efficiency, the embodiment as illustrated in FIG. 1 selectively applies suction to the nozzles 32 so that they clean their respective inner surfaces 26 while traveling in only one of these directions. This is accomplished by directing air flow from vertical bars 42a and 42b to hose 38a, directing the air flow from vertical bars 42c and 42d to hose 38b and selectively applying suction to hoses 38a and 38b.

Figure 7:
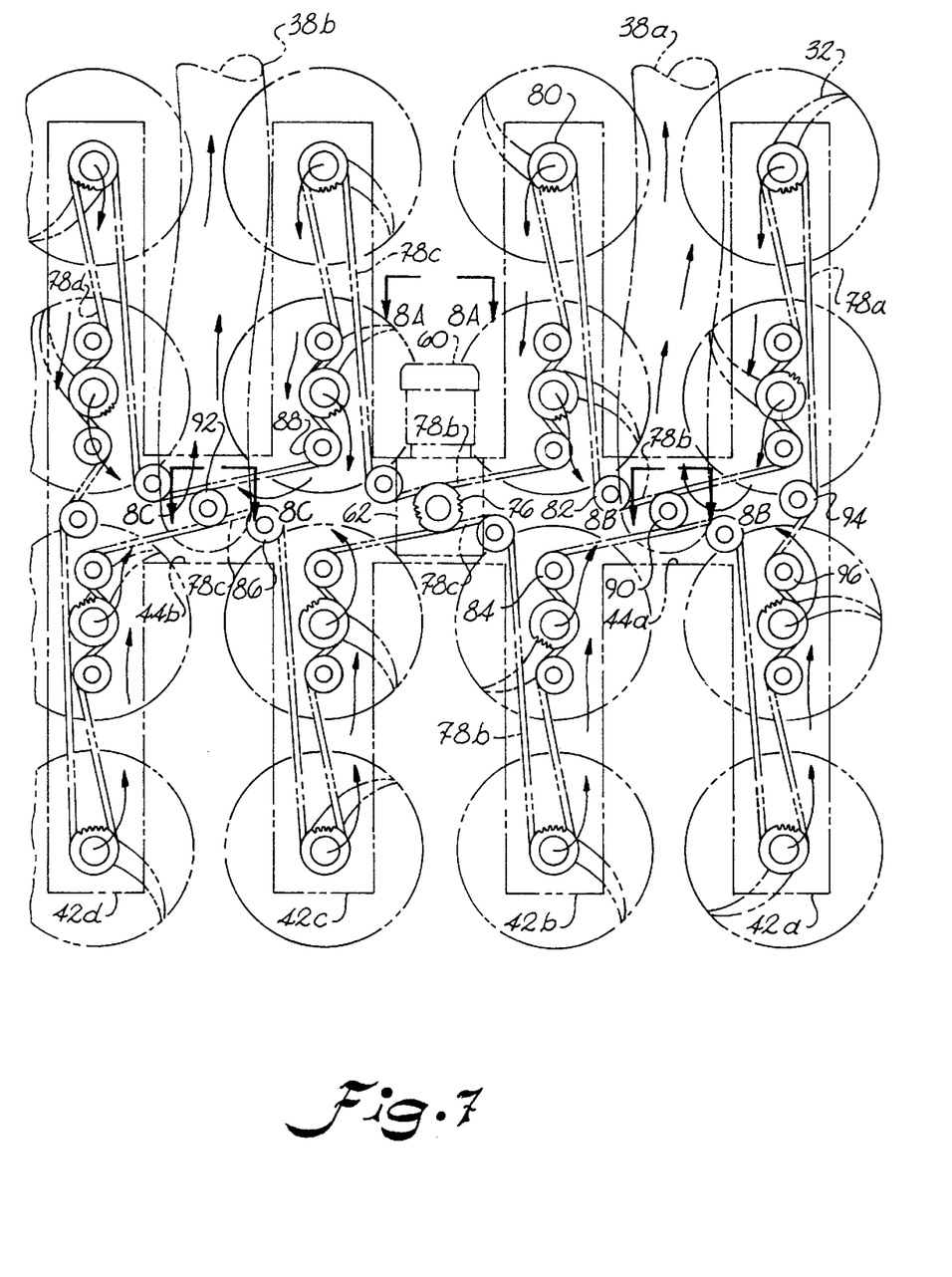
FIG. 7 is a plan view of an embodiment of a drive mechanism constructed in accordance with the filter system of the present invention.

Referring to FIG. 1 and the air flow arrows of FIG. 7, air is drawn into rear chambers 40 of vertical members 42a and 42b from their respective tubes 30 into horizontal member 44a and thus into hose 38a. A similar air flow pattern is followed through vertical members 42c and 42d to hose 38b. When frame 28 is in its fully inward position as shown in FIG. 1, controller 54, which may include limit switches, timing circuits such as sequence timers, or computer devices monitoring or predicting the position of the frame, opens damper 36b and closes damper 36a through relay 56. Controller 54 is illustrated schematically in FIG. 1 for purposes of clarity. In a preferred embodiment, however, it is disposed on frame 28 and includes a limit switch to react to the position of the frame.

Figure 5:
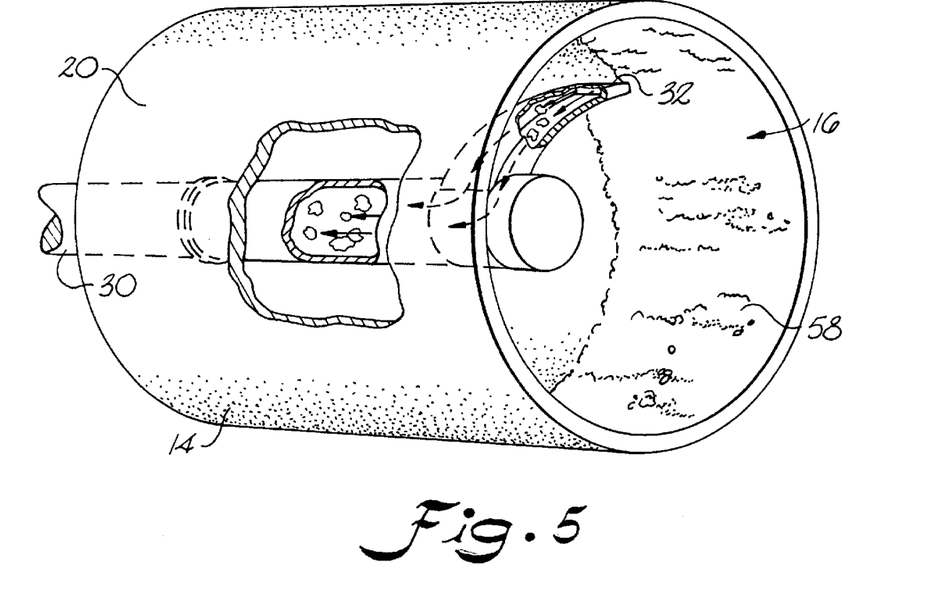
FIG. 5 is an enlarged partial view of a filter system constructed in accordance with the present invention illustrating a drum filter and device for removing waste material therefrom.

Accordingly, suction is applied from suction source 34 through open damper 36b to the suction nozzles of the tubes disposed on vertical bars 42c and 42d. Thus, as frame 28 is drawn to its fully extended position in FIG. 2, those nozzles clean their respective inner surfaces 26. When the frame reaches its position as shown in FIG. 2, however, control mechanism 54 reverses the positions of dampers 36a and 36b so that the remaining drum filters are cleaned as the frame returns to its position as in FIG. 1. As shown in FIG. 5, for example, a nozzle 32 removes waste material 58 from inner surface 26 of a filter 14 as tube 30 moves toward the filter's forward end 16.

Frame 28 is in a permanent operative position with respect to drum filter array 12. That is, the frame does not move from one array to another, or from one part of an array to another, during its operation. The frame may be removed for maintenance purposes or taken from one array or array section for use at another. The frame does not, however, automatically move from position to position along the array, or from one array to another, as a part of its operation.

Figures 8A, 8B, 8C:
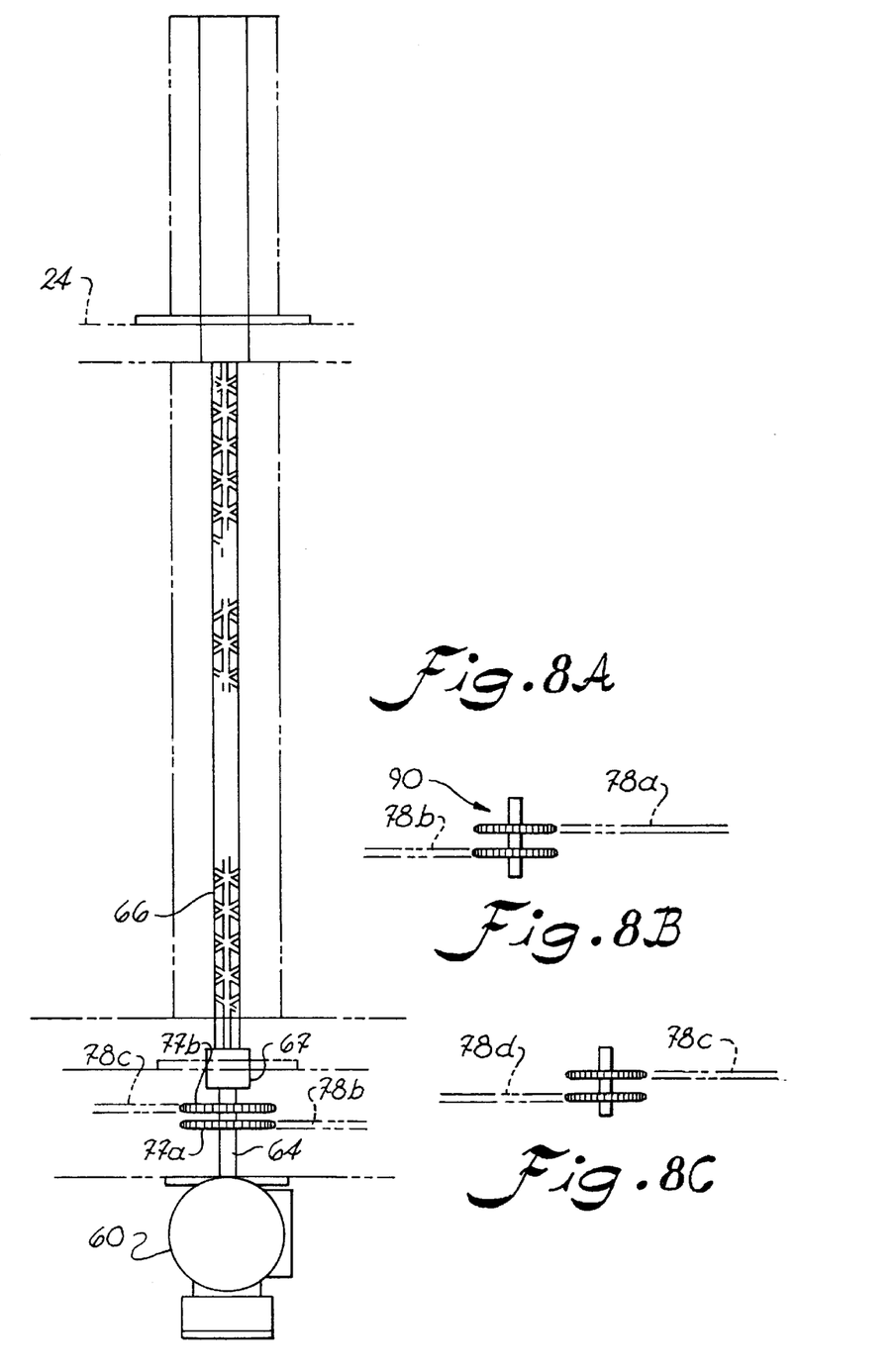
FIG. 8A is a partial top plan view of the drive mechanism taken along lines 8A—8A in FIG. 7.
FIG. 8B is a partial plan view taken along the lines 8B—8B in FIG. 7.
FIG. 8C is a partial plan view taken along the lines 8C—8C in FIG. 7.

Referring again to FIGS. 1 and 2, frame 28 is moved reciprocally with respect to array 12 by a double ball screw assembly driven by a motor 60. Referring also to FIG. 8A, motor 60 drives a gear assembly housed by a gearbox 62, which in turn drives a shaft 64 coupled to double ball screw 66 by a coupling 67. Double ball screw 66 is received by a nut which is secured within the housing for the drum filters. Thus, rotation of ball screw 66 alternately moves frame 28 axially toward and away from the drum filters of array 12 between the positions illustrated in FIG. 1 and FIG. 2.

The double ball screw arrangement permits motor 60 to operate in one direction. Thus, tubes 30, which are driven by motor 60, rotate in the same direction throughout the frame's back and forth movement. It should be understood, however, that other configurations are possible. For example, nozzles 32 may extend straight out from their respective tubes 30, and ball screw 66 may be a single direction ball screw so that motor 60 changes direction to move the frame. Reversal of motor 60 to change directions may be effected by a variety of suitable control mechanisms, for example including limit switches, position detectors, contact switches, sequence timers or computing devices which change the direction of motor 60 based on the position of frame 28. Controller 54 could be used to control the operation of both the motor and the dampers.

In either construction, the back and forth movement of frame 28 may be made continuous so that filters 14 are continuously cleaned. As described above, the suction nozzles 32 may be used to draw waste from the interior surfaces 26 as the frame travels in one direction or both directions.

Figure 4:
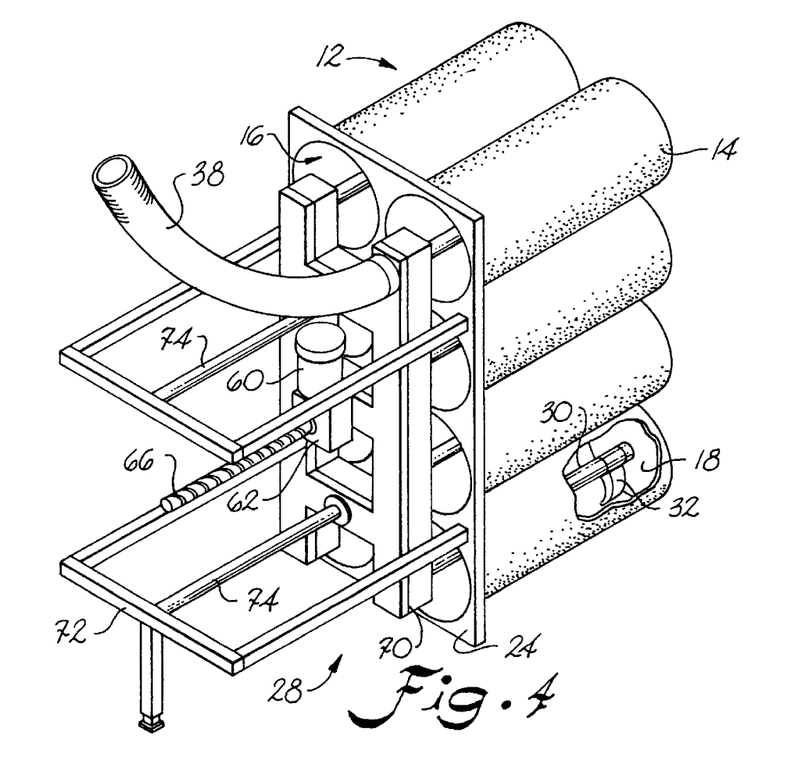
FIG. 4 is a perspective view of another embodiment of the filter system according to the present invention.

A different ball screw assembly configuration is illustrated in FIG. 4, where frame 28 is disposed proximate front ends 16 of drum filters 14 so that tubes 30 extend through forward ends 16. In this embodiment, frame 28 includes a moving section 70 mounted to a non-moving section 72 by rods 74. In this instance, front wall 24 may also serve as part of frame 28.

Figure 3:
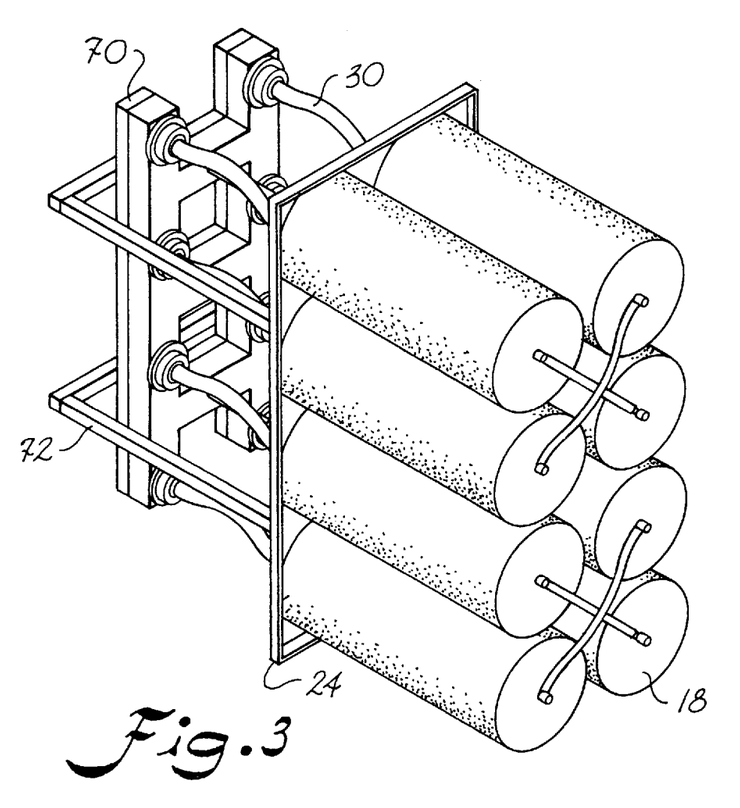
FIG. 3 is a perspective view of another embodiment of the filter system according to the present invention.

Ball screw 66 may be secured to, for example, frame section 72, front wall 24 or a housing of array 12. The nut may be housed by gearbox 62 or otherwise to a moveable part of the frame and is rotated by motor 60 so that moving section 70 moves between an inward position illustrated in FIG. 4 and an extended position illustrated in FIG. 3.

The drive system for the tubes 30 is illustrated in FIGS. 7 and 8. Referring to FIG. 7, motor 60 drives a drive sprocket 76 through gearbox 62. As shown in FIG. 8A, drive sprocket 76 is a double sprocket including driven sprockets 77a and 77b, which drive belts or chains 78b and 78c, respectively. Through a series of tension pulleys, belts 78b and 78c drive sprockets 80, which in turn drive tubes 30 (FIG. 1) to rotate nozzles 32.

FIG. 7 illustrates an array of filters having four vertical columns. The system may be used, however, to drive any number of rows or columns. For example, for a two by four array as shown in FIG. 4, belt or chain 78b may be run about the opposite side of pulley 82 down to pulley 84. A similar arrangement would be effected between pulleys 86 and 88 regarding belt 78c. Of course, one of the hoses 38a and 38b (or both, if a dual system is used as described above) must be positioned elsewhere on frame 28, for example on a vertical member 42 as shown in FIG. 4. Additional vertical members may be added as needed, for example by attaching additional horizontal members 44 to an end vertical member by a coupling between the horizontal and vertical members. The coupling mechanically attaches the vertical members through the horizontal member and permits air flow therebetween, for example by forward channels 40 as shown in FIG. 1. Thus, multiple columns may be added to the frame to serve arrays of various sizes. The vertical members may be extended vertically by a similar coupling mechanism to serve additional rows. Such construction provides a flexible cleaning system that may be driven by a single motor.

Accordingly, while the construction illustrated in FIG. 7 includes a frame having four columns and four rows to serve a sixteen drum filter array, it should be understood that the frame may be constructed to serve any number of drum filters, either as a changeable or non-changeable structure. Additionally, the cleaning system may be employed as a unitary block driven by one or more motors or as discrete units. The particular configuration will depend upon various factors, such as the filter array layout and the capacity of the suction source or sources. It should be understood that all such configurations are within the scope and spirit of the present invention.

Returning to FIG. 7, the tubes of the four by four array are driven by four belts. The operation of belts 78b and 78c is discussed above. The tubes rotatably attached to vertical members 42a and 42d, however, are respectively driven by belts or chains 78a and 78d. Belt 78a is driven by double sprocket 90, as illustrated in FIG. 8B, while belt 78d is driven by double sprocket 92, as illustrated in FIG. 8C. An additional vertical section could be added to vertical section 42a, for example through a coupling as described above and by rerouting belt 78a to the other side of tension pulley 94 to thereafter extend around a double sprocket of an adjoining member.

The belt and pulley assembly illustrated in FIG. 7 is disposed on the frame between the vertical members and the filter array. The assembly is omitted from the other figures for the sake of clarity. It should be understood that other suitable drive arrangements may be used.

Figure 6:
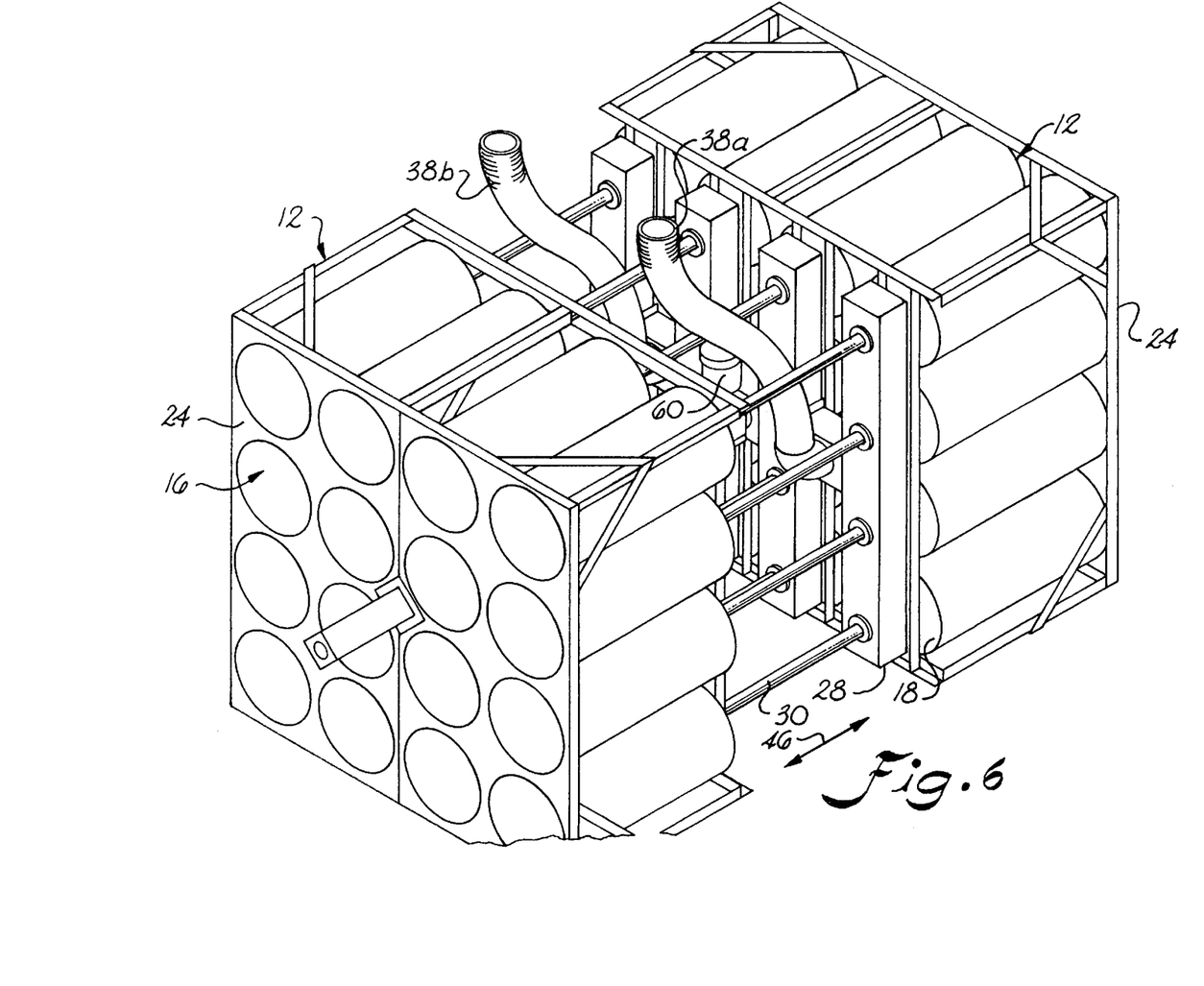
FIG. 6 is a perspective view of another embodiment of the filter system according to the present invention.

Another preferred embodiment is illustrated in FIG. 6, wherein a single frame 28 supports two arrays of tubes 30 extending in opposite directions to serve back-to-back filter arrays 12. Frame 28 moves reciprocally as indicated by arrow 46 to clean both filter arrays in the manner described above. Although not shown in FIG. 6, nozzles 32 as illustrated in FIG. 1 extend from each of the tubes 30 to clean the filters in both arrays. All the tubes 30 are driven by a common belt and pulley system, for example as shown in FIG. 7, in which each pair of opposing tubes 30 are driven by a common sprocket 80 (FIG. 7). Thus, since the belt and pulley system may be disposed on one side of frame 28, one set of tubes 30 extends through the vertical members to their respective drive sprockets 80. Accordingly, the thirty two tubes 30 of FIG. 6 may be driven by a single motor 60.

While preferred embodiments of the invention have been described above, it should be understood that any and all equivalent realizations of the present invention are included within the scope and spirit thereof. The embodiments depicted are presented by way of example only and are not intended as limitations upon the present invention. For example, the vertical and horizontal members included in the frames illustrated in the Figures may be replaced by other suitable structures for rotationally supporting the tubes extending into the drum filters. Thus, it should be understood by those of ordinary skill in this art that the present invention is not limited to these embodiments since modifications can be made. Therefore, it is contemplated that any all such embodiments are included in the present invention as may fall within the literal or equivalent scope of the appended claims.

What is claimed is:

1. An airborne waste system, said system comprising:

an array of drum filters, each drum filter of said array of drum filters having a forward end into which air carrying waste material flows, a rearward end longitudinally opposite said forward end, and a filter section extending between said forward end and said rearward end, said forward end, said rearward end and said filter section defining an interior area of said drum filter;

a frame disposed in a permanent operative position proximate said array of drum filters;

a plurality of longitudinal members, each said longitudinal member operatively disposed on said frame and extending into a said interior area of a said drum filter and having a suction nozzle extending therefrom to operatively communicate with the interior surface of said filter section for removing said waste material therefrom;

a drive mechanism in operative communication with said longitudinal members to rotate each said longitudinal member about its longitudinal axis and to reciprocally move each said longitudinal member substantially along the longitudinal axis of said drum filter into which said longitudinal member extends so that a suction end of said suction nozzle is moved substantially over said inner surface of said filter section; and a suction source in operative communication with each said suction nozzle, said suction source configured to apply suction to said suction nozzle so that said waste material is drawn therethrough.

2. The system as in claim 1, wherein said frame is disposed proximate said rearward ends of said drum filters of said array of drum filters and wherein said longitudinal members extend through respective said rearward ends.

3. The system as in claim 2, wherein said rearward end of each of said drum filters includes a plate to prevent flow of said air carrying said waste material therethrough and wherein each said longitudinal member extends through a respective said plate in sealing engagement therewith.

4. The system as in claim 1, wherein said frame includes a frame section to which said longitudinal members are rotatably attached in an axially fixed position and wherein said drive mechanism is operatively associated with said frame section to reciprocally move said frame section axially with respect to said drum filters.

5. The system as in claim 4, wherein said drive mechanism includes a ball screw assembly axially aligned with respect to said drum filters so that said ball screw assembly drives said frame section axially with respect to said drum filters of said drum filter array, and a motor operatively associated with said ball screw assembly to drive said ball screw assembly.

6. The system as in claim 5, wherein said motor is operatively associated with said longitudinal members to rotationally drive said longitudinal members.

7. The system as in claim 1, including at least two suction conduits, a first said suction conduit in operative association with a first group of said suction nozzles and said suction source so that suction is applied to said suction nozzles of said first group from said suction source, a second said suction conduit in operative communication with a second group of said suction nozzles and said suction source so that suction is applied to said suction nozzles of said second group from said suction source, and a control mechanism configured to selectively apply suction from said suction source to said suction nozzles of said first group and said second group.

8. The system as in claim 7, wherein said suction conduits apply suction to said suction nozzles through said frame member and said longitudinal members from which said suction nozzles extend so that said waste is drawn through said suction nozzles, said longitudinal members and said suction conduits.

9. The system as in claim 7, wherein said control mechanism includes a first damper which in a closed state blocks suction through said first suction conduit and in an open state permits suction through said first suction conduit, and a second damper which in a closed state blocks suction through said second suction conduit and in an open state permits suction through said second suction conduit, and wherein said control mechanism opens and closes said first damper and said second damper.

10. The system as in claim 7, wherein said control mechanism applies suction to said suction nozzles of said first group as said suction nozzles of said first group are moved in a first longitudinal direction within said interior area and wherein said control mechanism applies suction to said suction nozzles of said second group as said suction nozzles of said second group are moved in the opposite longitudinal direction within said interior area.

11. The system as in claim 2, including a covering operatively associated with said forward end of at least one said drum filter, said covering configured to be selectively placed over said forward end of said at least one drum filter to block air flow into said at least one drum filter.

12. The system as in claim 1, wherein said filter section of each said drum filter defines a substantially cylindrical surface area between said forward end and said rearward end.

13. An airborne waste filter system, said system comprising:
an array of drum filters, each drum filter of said array of drum filters having a forward end into which air carrying waste material flows, a rearward end longitudinally opposite said forward end, and a filter section extending between said forward end and said rearward end, said forward end, said rearward end and said filter section defining an interior area of said drum filter;
a frame disposed in a permanent operative position proximate said rearward ends of said drum filters of said array of drum filters;
a plurality of longitudinal members, each said longitudinal member disposed rotatably about its longitudinal axis on a section of said frame and extending through a said rearward end into a said interior area of a said drum filter and having a suction nozzle extending therefrom to operatively communicate with the interior surface of said filter section for removing said waste material therefrom;
a drive mechanism in operative communication with said longitudinal members and said frame section to simultaneously
rotate each said longitudinal member about its longitudinal axis and
reciprocally move said frame section axially with respect to said drum filters so that a suction end of each said suction nozzle is moved substantially over said inner surface of said filter section; and
a suction source in operative communication with each said suction nozzle, said suction source configured to apply suction to said suction nozzle so that said waste material is drawn therethrough.

14. The system as in claim 13, wherein said filter section of each said drum filter defines a substantially cylindrical surface area between said forward end and said rearward end and said rearward end of each said drum filter includes a plate to prevent flow of said air carrying said waste material therethrough and wherein each said longitudinal member extends through a respective said plate in sealing engagement therewith.

15. The system as in claim 13, including at least two suction conduits, a first said suction conduit in operative association with a first group of said suction nozzles and said suction source so that suction is applied to said suction nozzles of said first group from said suction source, a second said suction conduit in operative communication with a second group of said suction nozzles and said suction source so that suction is applied to said suction nozzles of said second group from said suction source, and a control mechanism configured to selectively apply suction from said suction source to said suction nozzles of said first and second groups.

16. The system as in claim 13, wherein said drive mechanism includes a ball screw assembly axially aligned with respect to said drum filters so that said ball screw assembly drives said frame section axially with respect to said drum filters of said drum filter array, and a motor operatively associated with said ball screw assembly to drive said ball screw assembly.

17. The system as in claim 16, wherein said motor is operatively associated with said longitudinal members to rotationally drive said longitudinal members.

18. An airborne waste filter system, said system comprising:
a first array of drum filters, each drum filter of said first array of drum filters having a forward end into which air carrying waste material flows, a rearward end longitudinally opposite said forward end, and a filter section extending between said forward end and said rearward end, said forward end, said rearward end and said filter section defining an interior area of said drum filter;

a second array of said drum filters axially aligned with said first array so that said rearward ends of said drum filters of said first array oppose said rearward ends of said drum filters of said second array;

a frame disposed in a permanent operative position between said first array and said second array and proximate said rearward ends of said drum filters of said first array and said second array;

a plurality of longitudinal members, each said longitudinal member disposed rotatably about its longitudinal axis on a section of said frame and having a first end extending through a said rearward end into a said interior area of a said drum filter of said first array, a second end extending through a said rearward end into a said interior area of a said drum filter of said second array, and two suction nozzles, each said suction nozzle extending from said longitudinal member proximate a respective one of said first end and said second end to operatively communicate with the interior surface of respective said filter sections for removing said waste material therefrom;

a drive mechanism in operative communication with said longitudinal members and said frame section to simultaneously
   rotate each said longitudinal member about its longitudinal axis and
   reciprocally move said frame section axially with respect to said drum filters so that a suction end of each said suction nozzle is moved substantially over said inner surface of said filter section; and a suction source in operative communication with each said suction nozzle, said suction source configured to apply suction to said suction nozzle so that said waste material is drawn therethrough.

19. An airborne waste filter system, said system comprising:

an array of drum filters, each drum filter of said array of drum filters having a forward end into which air carrying waste material flows, a rearward end longitudinally opposite said forward end and including a plate to prevent flow of said air carrying said waste material through said rearward end, and a filter section extending between said forward end and said rearward end, said forward end, said rearward end and said filter section defining an interior area of said drum filter;

a frame disposed in a permanent operative position proximate said rearward ends of said drum filters of said array of drum filters;

a plurality of longitudinal members, each said longitudinal member disposed rotatably about its longitudinal axis on a section of said frame and extending through a said plate into a said interior area of a said drum filter and having a suction nozzle extending therefrom to operatively communicate with the interior surface of said filter section for removing said waste material therefrom;

a drive mechanism in operative communication with said longitudinal members and said frame section to simultaneously
   rotate each said longitudinal member about its longitudinal axis and
   reciprocally move said frame section axially with respect to said drum filters so that a suction end of each said suction nozzle is moved substantially over said inner surface of said filter section; and a suction source in operative communication with each said suction nozzle, said suction source configured to apply suction to said suction nozzle through said frame and said longitudinal member from which said suction nozzle extends so that said waste material is drawn therethrough.

20. An airborne waste filter system, said system comprising:

an array of drum filters, each drum filter of said array of drum filters having a forward end into which air carrying waste material flows, a rearward end longitudinally opposite said forward end, and a filter section extending between said forward end and said rearward end, said forward end, said rearward end and said filter section defining an interior area of said drum filter;

a frame disposed proximate said array of drum filters;

a plurality of longitudinal members, each said longitudinal member operatively disposed on said frame and extending into a said interior area of a said drum filter and having a suction nozzle extending therefrom to operatively communicate with the interior surface of said filter section for removing said waste material therefrom;

a drive mechanism in operative communication with said longitudinal members to rotate each said longitudinal member about its longitudinal axis; and a suction source in operative communication with each said suction nozzle, said suction source including at least two suction conduits, a first said suction conduit in operative association with a first group of said suction nozzles to apply suction to said suction nozzles of said first group so that said waste material is drawn through said suction nozzles of said first group, a second said suction conduit in operative communication with a second group of said suction nozzles to apply suction to said suction nozzles of said second group so that said waste material is drawn through said suction nozzles of said second group, and a control mechanism configured to selectively apply suction through said first and second suction conduits to said suction nozzles of said first group and said second group.

21. The system as in claim 20, wherein each said suction conduit applies suction to its respective said suction nozzles through said frame member and said longitudinal members from which said suction nozzles extend so that said waste material is drawn through said suction nozzles, said longitudinal members and said suction conduits.

22. The system as in claim 20, wherein said control mechanism includes a first damper which in a closed state blocks suction through said first suction conduit and in an open state permits suction through said first suction conduit, and a second damper which in a closed state blocks suction through said second suction conduit and in an open state permits suction through said second suction conduit, and wherein said control mechanism opens and closes said first damper and said second damper.

* * * * *